United States Patent
Menendez Fernandez

(12) 
(10) Patent No.: US 6,710,571 B2
(45) Date of Patent: Mar. 23, 2004

(54) HOUSEHOLD ELECTRICAL APPLIANCE OPERABLE AT MORE THAN ONE A.C. FREQUENCY

(75) Inventor: Maria Del Carmen Menendez Fernandez, Zaragoza (ES)

(73) Assignee: BSH Balay S.A., Zaragoza (ES)

( * ) Notice: Subject to any disclaimer, the term of this patent is extended or adjusted under 35 U.S.C. 154(b) by 0 days.

(21) Appl. No.: 10/018,380

(22) PCT Filed: Apr. 2, 2001

(86) PCT No.: PCT/EP01/03736

§ 371 (c)(1),
(2), (4) Date: Apr. 8, 2002

(87) PCT Pub. No.: WO01/80415

PCT Pub. Date: Oct. 25, 2001

(65) Prior Publication Data

US 2002/0113567 A1 Aug. 22, 2002

(30) Foreign Application Priority Data

Apr. 18, 2000 (ES) ............................................ 200001111

(51) Int. Cl.⁷ ................................ H02P 1/46; H02P 7/42
(52) U.S. Cl. ...................... 318/709; 318/723; 318/254
(58) Field of Search .............................. 318/700, 709, 318/720, 721, 722, 723, 724, 254, 439, 138, 139, 713

(56) References Cited

U.S. PATENT DOCUMENTS

| | | | | | |
|---|---|---|---|---|---|
| 3,611,087 A | * | 10/1971 | Shtein | ........................ | 318/807 |
| 4,225,812 A | * | 9/1980 | Kraus | ........................ | 388/830 |
| 4,550,281 A | * | 10/1985 | Hirata | ........................ | 318/723 |
| 4,993,052 A | * | 2/1991 | Hammelsbacher | .......... | 318/599 |
| 5,282,723 A | * | 2/1994 | Bellomo | ...................... | 417/45 |

FOREIGN PATENT DOCUMENTS

| | | | | |
|---|---|---|---|---|
| DE | 30 10 629 A1 | | 9/1981 | |
| DE | 196 06 363 A1 | | 8/1997 | |
| DE | 196 42 098 A1 | | 4/1998 | |
| JP | 56153997 A | * | 11/1981 | ............. H02P/7/36 |
| JP | 57036593 A | * | 2/1982 | ............. H02P/7/36 |
| JP | 58 015 487 A | | 1/1983 | |
| JP | 03285596 A | * | 12/1991 | ........... H02P/7/622 |
| JP | 05284700 A | * | 10/1993 | ........... H02K/17/08 |
| JP | 07263154 A | * | 10/1995 | ........... H05B/41/16 |
| JP | 10085489 A | * | 4/1998 | ........... D06F/39/08 |

\* cited by examiner

*Primary Examiner*—Robert Nappi
*Assistant Examiner*—Eduardo Colon-Santana
(74) *Attorney, Agent, or Firm*—Laurence A. Greenberg; Werner H. Stemer; Gregory L. Mayback

(57) ABSTRACT

A household electrical appliance for a.c. operation includes a synchronous motor, a dropping resistor, and a device for inserting the dropping resistor. The synchronous motor is rated at a first frequency. The device inserts the dropping resistor in series with the synchronous motor for operating the synchronous motor at a second frequency.

4 Claims, No Drawings

HOUSEHOLD ELECTRICAL APPLIANCE OPERABLE AT MORE THAN ONE A.C. FREQUENCY

BACKGROUND OF THE INVENTION

Field of the Invention

The present invention relates to an electrical appliance for alternating-current operations.

Electrical appliances are usually connected to the household current supply, which delivers alternating current. In order to avoid expensive rectifying devices, large consumers in particular are rated for alternating-current operation. A synchronous or asynchronous motor can be utilized as the electromotor in an electrical appliance. The advantage of synchronous motors over asynchronous motors is that they are more economical and robust; however, they can be driven only with one frequency and at one corresponding speed. When synchronous motors are utilized, the appliance must be correspondingly adapted for utilization in an area with an a.c. supply with another frequency, which is disadvantageous. Electrical appliances are therefore preferably equipped with asynchronous motors.

SUMMARY OF THE INVENTION

It is the object of the invention to construct an appliance with at least one electromotor which is economical and can be utilized even in areas with different power supplies without expensive adaptation measures.

This object is inventively achieved by an appliance having at least one synchronous motor which is rated at a first frequency, which additionally contains a device for connecting a dropping resistor in series with the synchronous motor for purposes of operating the appliance with alternating current of a second frequency. This way, it is possible to equip the appliance with an efficient and robust synchronous motor without providing different variants with different motors for different frequencies. Production is thus simplified and substantially more advantageous. An ohmic or capacitive resistor can be provided as the dropping resistor. The insertion can be performed with the aid of a change-over switch that is connected in series with the synchronous motor, which can selectively switch the circuit via a line with or without a dropping resistor.

The a.c. resistance of a synchronous motor increases as the frequency rises, so that at excessively high frequencies the synchronous motor is supplied with too little power and delivers too little power, but without being at risk of overload. Thus, for utilization in an inventive appliance, the synchronous motor is rated at a frequency which corresponds to the highest foreseeable operating frequency. This is usually a frequency of 60 Hz, which occurs in the U.S.A. or in parts of Saudi Arabia. The dropping resistor is designed in such a way that with its aid the synchronous motor can be driven at another common frequency, such as the widely used frequency of 50 Hz. It must be taken into account that when the synchronous motor is driven with another frequency its speed changes despite the dropping resistor. The preferred field of application of the present invention is thus the driving of fans or pumps, for which the precise speed is usually of no importance. Expediently, in such cases the fan or pump is designed in such a way that the required delivery capacity is achieved even by operating at the lower frequency given an in-series dropping resistor.

When the appliance is to operate at more than two frequencies, a separate dropping resistor and means of inserting the various dropping resistors can be provided for each operating frequency. Given a plurality of fixed dropping resistors, it can also be provided that these be insertible in various combinations, so that a dropping resistor is not needed for each intended operating frequency.

In a particularly simple embodiment, the device for inserting the dropping resistor consists of a bypass that can be opened in order to insert the dropping resistor. In this case, the device for insertion need only be a simple closing switch whose two terminals are each connected to a terminal of the dropping resistor, so that when the switch closes the resistor is bypassed and rendered ineffective.

Beyond this, the inventive object can also be achieved by a controllable dropping resistor whose resistance value is raised for purposes of insertion. In this case, the dropping resistor always remains in the circuit of the synchronous motor, and its resistance value is switched between different values in accordance with the intended operating frequency. Thus, it can also be provided that the resistance value of the dropping resistor can be alternated among a number of values, so that the synchronous motor can also be driven at a number of frequencies. Given free adjustability, the synchronous motor can even be driven at an arbitrary number of frequencies. A further advantage is that the electrical current, which may be high, need not be carried via a switch.

In an advantageous embodiment, the device for inserting the dropping resistor can be manually activated. This is a very economical solution which is available in the present case because the appliance will be changed over for utilization at another operating frequency only extremely rarely. In most cases, the adjustment can be performed by the merchandiser. In this case, the customer does not have to change the setting as long as he does not move the appliance into an area with another frequency. Expediently, the appliance is set at the factory to the frequency of the area to which most appliances are shipped, so that the appliance has to be readjusted only in rare special cases.

For adapting the appliance to the different frequencies, a means of detecting the frequency of a connected a.c. supply can also be provided, which inserts the dropping resistor in dependence upon the detected frequency. In this embodiment, it is not necessary to provide any adjustability, because the appliance sets itself to the given frequency relations automatically.

Additional details, features and advantages of the invention derive from the following description of an exemplifying embodiment of an inventive appliance.

DETAILED DESCRIPTION OF THE PREFERRED EMBODIMENTS

The described exemplifying embodiment relates to a household washing machine in which a synchronous motor is utilized to drive the suds pump. The synchronous motor for driving the suds pump is of the type for operating at 220 V and 60 Hz. The rotor of the synchronous motor has a diameter of 37 mm and a length of 11 mm. The coil comprises 2,500 turns, is wound from a wire with a diameter of 0.28 mm, and has a resistance of 65 ohms. The synchronous motor additionally includes a temperature guard.

This synchronous motor is connected in series with a synchronous additional coil with 1,600 turns and a resistance of 60 ohms, which consists of a wire with a thickness of 0.224 mm. When the operating current of the synchronous motor is conducted through the series coil, the motor, which is originally rated at 60 Hz., can also be driven at 50 Hz. without being overloaded. The pump is designed in such a way that it achieves the requisite delivery with the two speeds corresponding to operations of the synchronous motor at 50 and 60 Hz, respectively.

The series coil can be bypassed with a simple rocker armature which is rated at a voltage of 250 volts and a current of 2 amps. The switch is connected to the washing machine in such a way that it can be externally activated. However, precautions must be taken that the switch is not inadvertently moved, for instance when the machine is moved. To this end, the switch can be disposed behind a flap that can be easily opened from outside, or in a somewhat concealed location.

With the invention, it is possible to construct a household appliance which, notwithstanding the utilization of robust and economical synchronous motors, can be utilized in areas with different a.c. supplies without expensive adjustment or adaptation measures and without having to account for different variants in the manufacturing process.

What is claimed is:

1. A household electrical appliance for a.c. operation, comprising:
   an inductor having adjustable impedance, said inductor being controllable to increase its value for insertion purposes and
   a dropping resistor; and
   a device for inserting said inductor in series with said synchronous motor for operating said synchronous motor at a second frequency.

2. The appliance according to claim 1, wherein said device for inserting said inductor is a bypass being open for purposes of insertion.

3. The appliance according to claim 1, wherein said device for inserting said for inductor is manually activated.

4. The appliance according to claim 1, including a device for detecting the frequency of a connected a.c. supply, said device inserting said inductor depending upon the detected frequency.

* * * * *